US008224122B2

(12) United States Patent
Cohen et al.

(10) Patent No.: US 8,224,122 B2
(45) Date of Patent: Jul. 17, 2012

(54) DYNAMIC VIEWING OF WIDE ANGLE IMAGES

(75) Inventors: Michael Cohen, Seattle, WA (US); Matthew Uyttendaele, Seattle, WA (US); Johannes Kopf, Konstanz (DE)

(73) Assignee: Microsoft Corporation, Redmond, WA (US)

( * ) Notice: Subject to any disclaimer, the term of this patent is extended or adjusted under 35 U.S.C. 154(b) by 1096 days.

(21) Appl. No.: 11/738,903

(22) Filed: Apr. 23, 2007

(65) Prior Publication Data

US 2008/0144968 A1 Jun. 19, 2008

Related U.S. Application Data (60) Provisional application No. 60/870,273, filed on Dec. 15, 2006.

(51) Int. Cl.
*G06K 9/32* (2006.01)

(52) U.S. Cl. ........ 382/298; 345/156; 345/427; 345/582; 345/611; 345/647; 348/143; 348/335; 348/36; 348/607; 353/121; 382/254; 382/284; 382/285; 382/299

(58) Field of Classification Search ........................ None
See application file for complete search history.

(56) References Cited

U.S. PATENT DOCUMENTS

| | | | | |
|---|---|---|---|---|
| 5,396,583 | A | * | 3/1995 | Chen et al. .................... 345/427 |
| 5,999,660 | A | | 12/1999 | Zorin et al. |
| 6,005,611 | A | * | 12/1999 | Gullichsen et al. ......... 348/211.6 |
| 6,028,584 | A | * | 2/2000 | Chiang et al. .................. 345/628 |
| 6,067,112 | A | | 5/2000 | Wellner et al. |
| 6,097,854 | A | * | 8/2000 | Szeliski et al. ................ 382/284 |
| 6,215,519 | B1 | | 4/2001 | Nayar et al. |
| 6,369,818 | B1 | * | 4/2002 | Hoffman et al. .............. 345/427 |
| 6,392,660 | B2 | | 5/2002 | Karjalainen |
| 6,400,848 | B1 | | 6/2002 | Gallagher |
| 6,559,853 | B1 | * | 5/2003 | Hashimoto et al. ........... 345/582 |
| 6,738,057 | B1 | * | 5/2004 | Campbell ...................... 345/611 |
| 6,778,207 | B1 | * | 8/2004 | Lee et al. ......................... 348/36 |
| 6,793,350 | B1 | * | 9/2004 | Raskar et al. ................. 353/121 |
| 6,798,923 | B1 | * | 9/2004 | Hsieh et al. ................... 382/284 |
| 6,833,843 | B2 | * | 12/2004 | Mojaver et al. ............... 345/647 |
| 7,006,707 | B2 | * | 2/2006 | Peterson ....................... 382/285 |
| 7,058,237 | B2 | | 6/2006 | Liu et al. |
| 7,068,841 | B2 | | 6/2006 | Luo |
| 7,126,616 | B2 | * | 10/2006 | Jasa et al. ...................... 345/645 |
| 7,130,485 | B2 | | 10/2006 | Gindele et al. |

(Continued)

OTHER PUBLICATIONS

About Zoomify, Inc., available at http://www.zoomify.com/about.htm.

(Continued)

*Primary Examiner* — Anand Bhatnagar
*Assistant Examiner* — Tsung-Yin Tsai
(74) *Attorney, Agent, or Firm* — Lyon & Harr, LLP; Richard T. Lyon (57) ABSTRACT

A dynamic wide angle image viewing technique is presented which provides a way to view a wide-angle image while zooming between a wide angle view and a narrower angle view that employs both perspective and non-perspective projection models. In general, this involves first establishing the field of view for a view of the wide angle image that is to be displayed. The view is then rendered and displayed based on the established field of view, such that the projection transitions between a perspective projection associated with narrower angle views and a non-perspective projection (e.g., cylindrical, spherical or some other parameterization) associated with wider-angle views.

20 Claims, 7 Drawing Sheets

U.S. PATENT DOCUMENTS

| | | | |
|---|---|---|---|
| 2002/0063802 A1* | 5/2002 | Gullichsen et al. | 348/607 |
| 2003/0095338 A1* | 5/2003 | Singh et al. | 359/725 |
| 2004/0001146 A1* | 1/2004 | Liu et al. | 348/207.99 |
| 2004/0008905 A1 | 1/2004 | Marche | |
| 2004/0070565 A1* | 4/2004 | Nayar et al. | 345/156 |
| 2004/0201768 A1* | 10/2004 | Cahill et al. | 348/335 |
| 2005/0007453 A1* | 1/2005 | Ahiska | 348/143 |
| 2005/0007477 A1* | 1/2005 | Ahiska | 348/335 |
| 2005/0243103 A1* | 11/2005 | Rudolph | 345/647 |
| 2006/0050074 A1* | 3/2006 | Bassi | 345/427 |
| 2006/0056056 A1* | 3/2006 | Ahiska et al. | 359/690 |
| 2006/0209194 A1 | 9/2006 | Liu et al. | |
| 2007/0159524 A1* | 7/2007 | Kim et al. | 348/36 |
| 2007/0211955 A1* | 9/2007 | Pan et al. | 382/254 |
| 2008/0085063 A1* | 4/2008 | Saito | 382/299 |
| 2008/0088526 A1* | 4/2008 | Kadantseva et al. | 345/1.1 |

OTHER PUBLICATIONS

Durand, F., J. Dorsey, Fast bilateral filtering for the display of high-dynamic-range images, ACM Transactions on Graphics, 2002, pp. 257-266, vol. 21, No. 3.

Fattal, R., D. Lischinski and M. Werman, Gradient domain high dynamic range compression, Proceedings of ACM SIGGRAPH, 2002, pp. 249-256, vol. 21, No. 3.

HiRISE: High resolution imaging science experiment, available at http://marsoweb.nas.nasa.gov/HiRISE/.

iSeeMedia Zoom Plug-in Viewer for Macintosh, available at http://www.iseemedia.com/customerService/ viewers/Plugin/macintosh/readme/readme.htm#2D.

Kropp, A., N. Master, and S. Teller, Acquiring and rendering high-resolution spherical mosaics, Proceedings IEEE Workshop on OmniDirectional Vision, Jun. 2000, pp. 47-53.

Lischinski, D., Z. Farbman, M. Uyttendaele, and R. Szelinski, Interactive local adjustment of tonal values, ACM Transactions on Graphics, pp. 646-653, vol. 25, No. 3, 2006

Reinhard, E., Parameter estimation for photographic tone reproduction, Journal of Graphics Tools, pp. 45-52, vol. 7, No. 1, Nov. 2002.

Reinhard, E., M. Stark, P. Shirley, and J. Ferwerda, Photographic tone reproduction for digital images, ACM Transactions on Graphics, pp. 267-276, vol. 21, No. 3, Jul. 2002.

\* cited by examiner

FIG. 1

```
input: theta, phi, fov, fov_trans_min, fov_trans_max
output: x, y

// perspective projection
(xp, yp) = PerspectiveProjection(theta, phi, fov)

// spherical projection
(xs, ys) = SphericalProjection(theta, phi, fov)

// blend
if( fov < fov_trans_min )
{
    (x, y) = (xp, yp)
}
else if( fov > fov_trans_max )
{
    (x, y) = (xs, ys)
}
else
{
    // blend
    alpha = (fov_trans_max-fov) / (fov_trans_max-fov_trans_min)
    (x, y) =   (alpha)(xp, yp)  + (1-alpha)(xs, ys)
}
```

DYNAMIC VIEWING OF WIDE ANGLE IMAGES

CROSS-REFERENCE TO RELATED APPLICATIONS

This application claims the benefit of a previously-filed provisional patent application Ser. No. 60/870,273 on Dec. 15, 2006.

BACKGROUND

A normal image is typically captured with a camera having a 30-70 degree field of view. Special cameras and lenses can produce much wider fields of view, and by using software multiple images can be stitched together into even wider fields of view all the way to a complete sphere. In addition, such images can be generated using a virtual camera viewing a virtual 3D world.

An image can be thought of as a two dimensional set of rays or directions passing through a small pinhole representing the viewpoint of the image. These rays are mapped to a 2D surface for display. The mapping for standard images is created through a "perspective" transformation involving projecting the rays onto a planar surface. This is called a perspective projection and has the advantage of keeping all straight lines straight. Unfortunately perspective projections begin to create large distortions as the field of view passes 90 degrees and as it approaches 180 degrees the distortion becomes infinitely large. Thus, other projections have been developed, such as projections onto cylindrical or spherical surfaces (i.e., projecting onto a curved surface). These projections are "unwrapped" to the plane of a screen for display. This unwrapping allows very wide angle images to be displayed but at the cost of a certain flattening of the result and making straight lines in the world appear curved.

When viewing wide angle images one often wants to be able to pan and zoom to view the entire scene or to examine a smaller portion of the image to appreciate the details. This is especially true when the image is a high resolution image. New high resolution cameras and software stitching technologies allow the creation of very high resolution wide angle images up to billions of pixels. Viewing such images on a computer screen can leverage the high resolution by allowing a user to zoom in (narrow the field of view) and zoom out (widen the field of view) and pan about the image while still utilizing the full resolution of the screen.

A problem arises in the foregoing zooming in and out of a wide angle image in that if the image data is displayed as a perspective projection, zooming out to see more of the scene will result in an image that is distorted at its edges when the field of view exceeds about 70 degrees. On the other hand, if the image data is displayed as a cylindrical or spherical projection, zooming in will produce unacceptable results in comparison to a perspective projection, owing to the aforementioned flattening and curving of straight lines in the displayed image.

SUMMARY

The present dynamic wide angle image viewing technique provides a way to view a wide-angle image while zooming between a wide angle view and a narrower angle view that employs both perspective and non-perspective projection models. In general, this involves first establishing the field of view and viewing direction for the view (i.e., frame) of the wide angle image that is to be displayed. The view is then rendered and displayed, such that its projection transitions between a perspective projection associated with narrower angle views and a non-perspective projection (e.g., cylindrical, spherical or some other parameterization) associated with wider-angle views. This is very effective for panning and zooming over large images and provides the best of both viewing paradigms in a unified framework.

In one embodiment of the present dynamic wide angle image viewing technique, the transition between the projections is abrupt and occurs at a prescribed zoom level. In one embodiment of the present technique, a pair of screen coordinates is first established for each pixel or selected pixels representing vertices of a mesh on a display screen. In addition, the field of view and viewing direction that are to be used to generate the view of the wide angle image are established. For each pixel (i.e., pair of screen coordinates), a ray defined by two angles is computed. This ray represents the direction from the viewer through the pair of screen coordinates under consideration. In this embodiment, the view represents a projection that is either perspective, a fully curved non-perspective or lies between a perspective projection and the non-perspective projection. Generally, this is generated by warping the perspective projection toward the non-perspective projection by an amount that is proportional to the established field of view, with the amount of warping being greater for wider fields of view up to the limit of the non-perspective projection itself. Next, the view of the wide angle image is rendered based on the computed rays. The rendered view is then displayed on the display screen.

In yet another embodiment of the present technique, the field of view and a central viewing direction are established, which are to be used to generate the view of the wide angle image. A pair of screen coordinates is then established for each of a set of viewing directions of interest within the established field of view and surrounding the central viewing direction, which is associated with a perspective projection of a view being rendered. Corresponding, a pair of screen coordinates is also established for each of the set of viewing directions of interest associated with a non-perspective projection of the view being rendered. For each of the viewing directions from the set of viewing directions of interest, it is first determined if the field of view of the frame being rendered based on the zoom level is less than or equal to a prescribed minimum field of view value, more than or equal to a prescribed maximum field of view value, or in between the prescribed values. If the field of view is found to be less than or equal to the prescribed minimum field of view value, the screen coordinates defined by the perspective projection model for the viewing direction under consideration are identified. If, on the other hand, it is determined that the field of view of the frame being rendered based on the zoom level is more than or equal to the prescribed maximum field of view value, the screen coordinates defined by the non-perspective projection model for viewing direction under consideration are identified. However, if it is found that the field of view is between the prescribed maximum and minimum field of view values, a blending approach is taken. In this blending approach, the screen coordinates defined by both the perspective and non-perspective models for the viewing direction under consideration are identified. An interpolated pair of screen coordinates is then computed based on a blending of the identified screen coordinates associated with the perspective and non-perspective projection models. In any case, the view that is to be displayed is rendered using each pair of the identified screen coordinates, or each pair of the blended screen coordinates, as the case may be. The view is then displayed on the display screen.

It is noted that while the foregoing limitations in existing systems used to display wide angle images described in the Background section can be resolved by a particular implementation of a technique for dynamically viewing wide angle images according to the present invention, this is in no way limited to implementations that just solve any or all of the noted disadvantages. Rather, the present wide angle image viewing technique has a much wider application as will become evident from the descriptions to follow.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Before providing a description of embodiments of the present dynamic wide-angle image viewing technique, a brief, general description of a suitable computing environment in which portions thereof may be implemented will be described. The present dynamic wide-angle image viewing technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
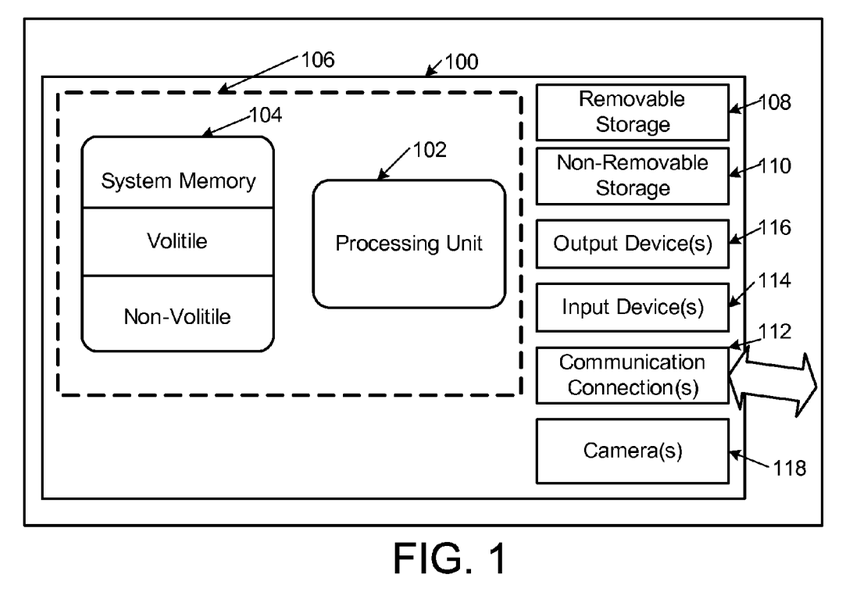
FIG. 1 is a diagram depicting a general purpose computing device constituting an exemplary system for implementing the present invention.

FIG. 1 illustrates an example of a suitable computing system environment. The computing system environment is only one example of a suitable computing environment and is not intended to suggest any limitation as to the scope of use or functionality of the present dynamic wide-angle image viewing technique. Neither should the computing environment be interpreted as having any dependency or requirement relating to any one or combination of components illustrated in the exemplary operating environment. With reference to FIG. 1, an exemplary system for implementing the present dynamic wide-angle image viewing technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Of particular note is that device 100 can include a camera 118 (such as a digital/electronic still or video camera, or film/photographic scanner), which is capable of capturing a sequence of images, as an input device. Further, multiple cameras 118 could be included as input devices. The images from the one or more cameras are input into the device 100 via an appropriate interface (not shown). However, it is noted that image data can also be input into the device 100 from any computer-readable media as well, without requiring the use of a camera.

The present dynamic wide-angle image viewing technique may be described in the general context of computer-executable instructions, such as program modules, being executed by a computing device. Generally, program modules include routines, programs, objects, components, data structures, etc. that perform particular tasks or implement particular abstract data types. The present dynamic wide-angle image viewing technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present dynamic wide-angle image viewing technique.

2.0 Dynamic Wide-Angle Image Viewing Technique

Exploring wide angle, high resolution imagery on a computer involves freely moving between an overall view of the scene and a portion of the wide angle field of view. Panning (i.e., moving left-right, up-down) and zooming (i.e., changing the field of view) a virtual camera on the overall image allows a user to explore both the breadth and depth of the scene depicted. This exploration can involve viewing environments such as panoramic imagery, lat/long datasets such as the globe, or virtual environments such as 3D games.

From a system standpoint, the user employs a panning operator and a zooming operator to pan and zoom through the wide angle image. Examples of how these operators are implemented include panning by moving a screen cursor left, right, up, and down with the left mouse button pushed. Zooming could be achieved by scrolling the mouse wheel if available, or moving the cursor up and down with the right mouse button pressed. Other user-interface methods can also be used, such as including scroll bars or other affordances.

As described previously, the underlying image is stored in some parameterization that maps ray directions to pixel locations. Alternatively, a ray may represent a virtual ray that intersects a 3D virtual world at runtime. This mapping is thus typically either:

a) a perspective projection in which the horizontal and vertical position represents distance on a projection plane, b) a cylindrical projection in which one dimension represents distance and the other dimension represents angle, or c) a spherical projection in which both dimensions represent angular offsets, or d) the mapping implied by a ray direction and 3D virtual environment.

Other mappings are also possible including fisheye and other parameterizations.

Figure 2:
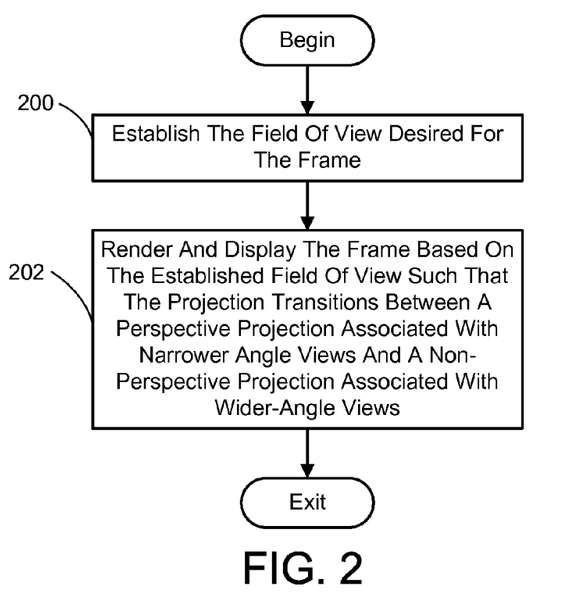
FIG. 2 is a flow diagram generally outlining a technique embodying the present invention for dynamically viewing a wide angle image by providing views transitioning between a perspective projection and a non-perspective projection while zooming between wide angle and narrow angle views of the image.

The present dynamic wide angle image viewing technique provides a way to view a wide-angle image while zooming between a wide angle view and a narrower angle view. Referring to FIG. 2, this generally involves for each view (i.e., frame) of the wide angle image to be presented, first establishing the field of view desired for the frame (200). Then, the frame is rendered and displayed based on the established field of view such that the projection transitions between a perspective projection associated with narrower angle views and a non-perspective projection (e.g., cylindrical, spherical or some other parameterization) associated with wider-angle views (202). This is very effective for panning and zooming over large images and provides the best of both viewing paradigms in a unified framework. The idea is to dynamically change the viewing projection on the fly as a viewer zooms in and out of an image.

To accomplish the transition between projections, a decision must be made with each frame as to which "virtual camera model" to use to map the pixels in the underlying representation to the computer screen to provide the best view. Just as with the image's underlying representation, a perspective, cylindrical, spherical, or other camera model are possibilities. The decision is based on the zoom level associated with the frame.

In one embodiment of the present technique the transition between the projections is abrupt and occurs at a prescribed zoom level. In other embodiments, the image is viewed in such a way as to utilize perspective as well as cylindrical and spherical projections (or other non-perspective parameterizations) in a seamless manner adapting to the momentary field of view being requested. Thus, in this latter embodiment, the view smoothly transitions between different projections.

In the sections to follow, embodiments of the present dynamic wide angle image viewing technique that produce the aforementioned smooth transitions between projections are described in more detail.

2.1 Smooth Projection Transitions

A (left-handed) world coordinate system is established with the viewer sitting at the origin (0,0,0), and light is coming in from all directions. The directions can be parameterized by two angles ($\theta$, $\phi$), $\theta$ can be thought of as the longitude on the surrounding sphere and $\phi$ as the latitude. Let $\theta=\phi=0$ (i.e., looking straight ahead) be along the positive z axis. The x axis is to the right, the y axis is up.

In general, rendering a screen pixel (x, y) works in two steps for each pixel:

a) Compute the (θ, φ) pair for (x, y) (i.e., screen→world transformation)
b) Compute the corresponding texture coordinates (world→texture transformation), or render the ray (θ, φ) in a virtual environment.

In this manner, the viewing projection (i.e., how is the world is viewed, e.g. perspectively) is decoupled from the texture projection (i.e., how is the image is stored in the texture, e.g. perspective, cylindrical, spherical).

In pseudo-code it can look like this:

```
for each pixel (x,y)
    (θ,φ) = invProjectScreen2World(x,y);
    (t_x,t_y) = projectWorld2Texture(θ,φ);
    (r,g,b) = textureLookup(t_x,t_y);
end for
or in the case of a virtual world
for each pixel (x,y)
    (θ,φ) = invProjectScreen2World(x,y);
    (r,g,b) = RenderRay(θ,φ);
end for
```

Thus, a ray (θ, φ) is computed for each pixel (or vertex location as will be described shortly). This computation will also be described in more detail later. The θ and φ correspond to world space angles (i.e., a spherical projection), however, this may not be the projection in which the image data (i.e., texture) has been stored. Accordingly, a straight forward conversion is made between the projection associated with the θ and φ values and the texture coordinates of the projection associated with the image data. These conversions are well known and so will not be described in any detail in the present description. Once the texture coordinates are known, the texture corresponding to these coordinates is obtained from the stored image data and used to render the pixel under consideration.

Figure 3:
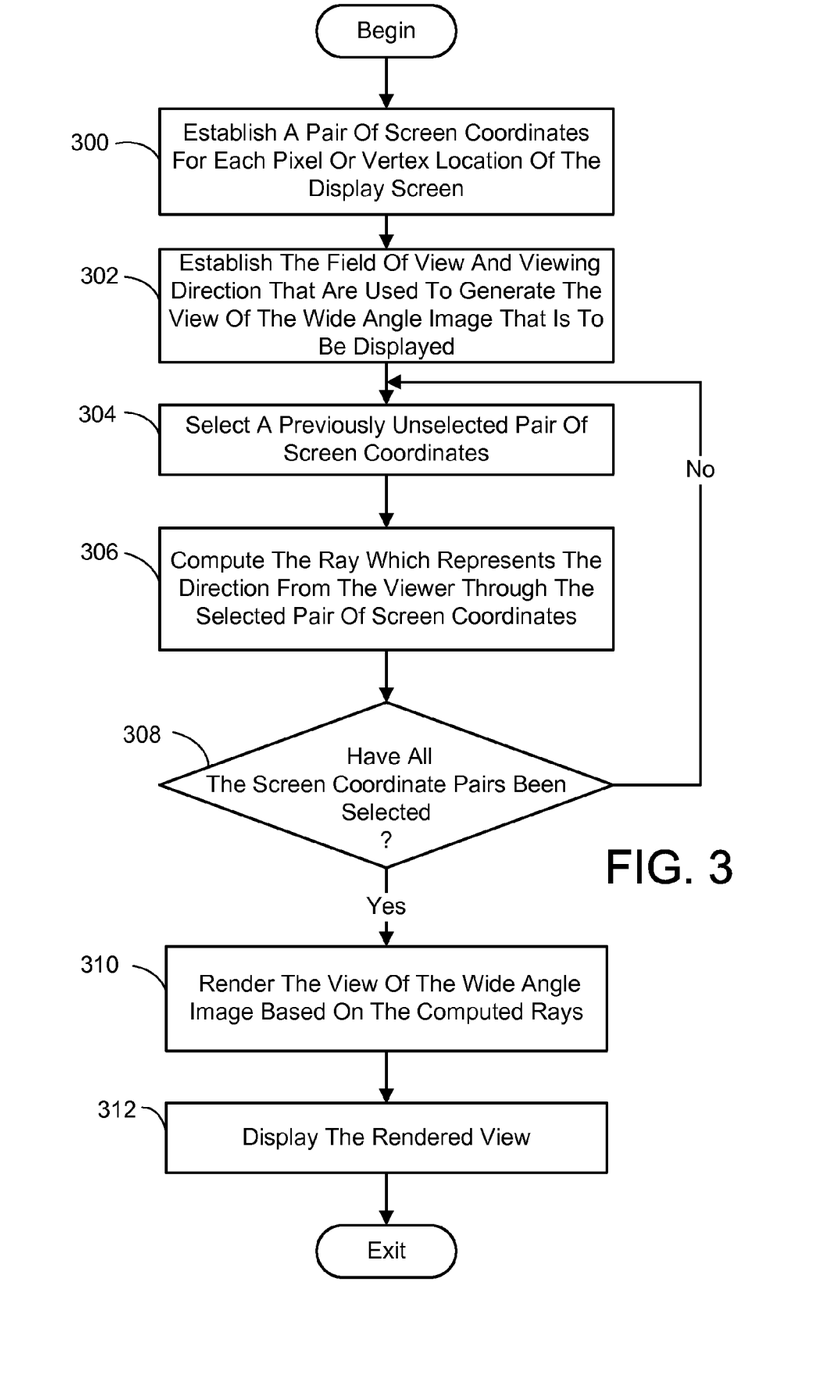
FIG. 3 is a flow diagram generally outlining one embodiment of a process for dynamically viewing a wide angle image which smoothly transitions between the perspective projection and a non-perspective projection.

In one embodiment, the present dynamic wide angle image viewing technique is accomplished as follows. Referring to FIG. 3, a pair of screen coordinates is first established for each pixel or vertex location of the display screen (300). In addition, the field of view and viewing direction that are used to generate the view of the wide angle image that is to be displayed, are established (302). For example, when a user is zooming from a wide angle view to a narrower angle view, or vice versa, views of the image exhibiting different fields of view related to the zoom level will be rendered and displayed at some prescribed rate (such as the refresh rate of the display screen). Thus, the field of view associated with a particular view would be established by the current zoom level existing at the time the view is rendered. The user might also be panning across the wide angle image. Thus, the viewing direction is established to identify the region of the image that is to be rendered.

The technique continues with the selection of a previously unselected pair of screen coordinates (304). The aforementioned ray, which represents the direction from the viewer through the selected pair of screen coordinates, is computed next (306). In general, the ray is determined by a projection that is between a perspective projection and the non-perspective projection. This can be generated by warping the perspective projection toward the non-perspective projection by an amount that is proportional to the established field of view, with the amount of warping being greater for wider fields of view up to the limit of the non-perspective projection itself. The next action in this embodiment of the present dynamic wide angle image viewing technique is to determine if all the pairs of screen coordinates have been selected and processed (308). If not, then actions (304) through (308) are repeated until all the coordinate pairs have been processed.

The view of the wide angle image is rendered next based on the computed rays (310). As alluded to previously, the projection in which the image data has been stored may or may not correspond to the spherical projection coordinates associated with the ray. If it does correspond, then rendering involves identifying the texture coordinates in a stored mapping of the wide angle image that correspond to the computed rays, and then obtaining the texture data corresponding to the identified texture coordinates from the mapping. The view is rendered using the obtained texture data. However, if the image data has been stored in a different projection, the rendering involves a preliminary action of converting the direction represented by each computed ray to the projection employed by the stored mapping. Once this conversion is made, the rendering proceeds as described above. In the case where the wide angle image is a virtual image, the rendering involves generating the texture data corresponding to the identified texture coordinates. In this latter case, the view is rendered using the generated texture data. Finally, the rendered view is displayed on the display screen (312).

There are mainly two ways to implement the foregoing rendering and displaying efficiently: using pixel-shaders for newer graphics hardware, or vertex arrays for fixed function graphics hardware. For the pixel shader implementation a single screen filling quadrilateral (or quad) is rendered. The pixel shader is automatically executed for each fragment (e.g., pixel), and computes the inner part of the foregoing "for" loop.

For the vertex array implementation, the screen is tessellated into a fine grid of vertices. To render an image, the texture coordinates are computed for each vertex in the manner described previously for pixels, and then the vertex array is rendered to the screen. In a tested embodiment, an index buffer was used to define an array of quads over the vertex grid.

2.1.1 Viewing Projection

A mental image when thinking about projections is the following. Take a display screen, place it in the world coordinate system, and paint it by intersecting the light rays with it. In the world coordinate system, the screen can be called the "projective surface" or just surface for short. In a final step, if this surface is curved, it is flattened out to the computer screen for display purposes.

Figure 4:
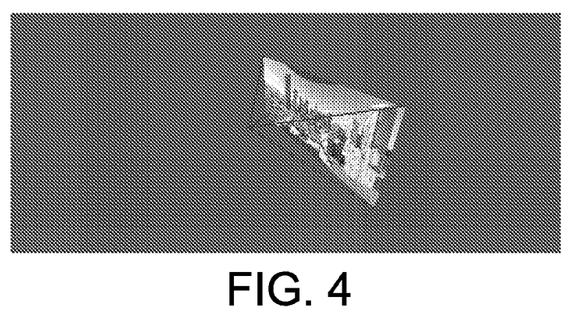
FIG. 4 is an image of a world space visualization of a perspective projection of a wide angle image.
Figure 5:
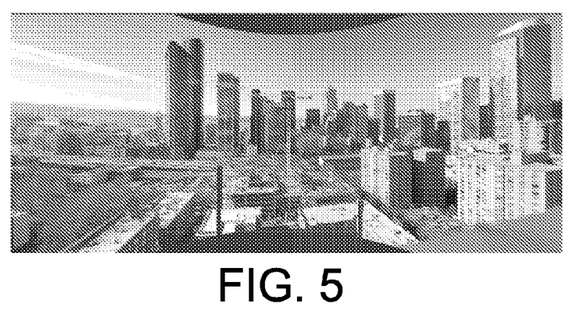
FIG. 5 is an image of a screen display of a perspective projection of a wide angle image.
Figure 6:
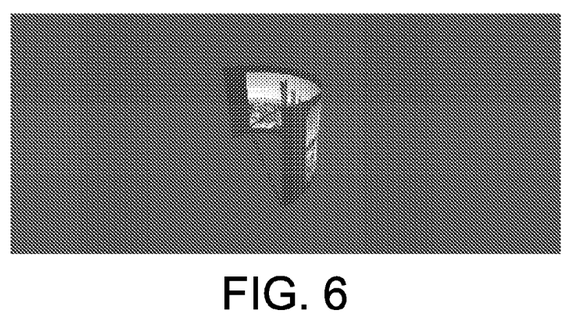
FIG. 6 is an image of a world space visualization of a non-perspective, cylindrical projection of a wide angle image.
Figure 7:
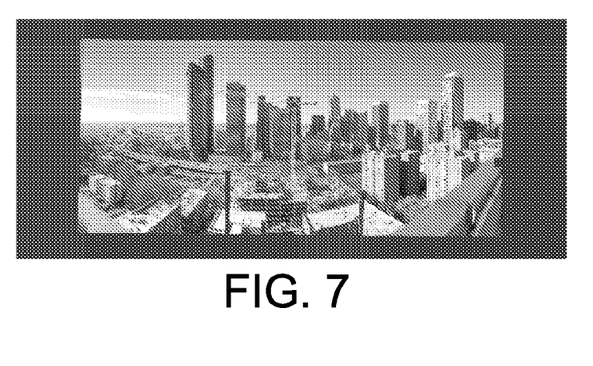
FIG. 7 is an image of a screen display of a non-perspective, cylindrical projection of a wide angle image.

Different projections, panning and zooming are realized by bending and scaling this surface and rotating it about the viewer. However, at narrow fields of view the surface is always a rectangle with the same aspect ratio as the display screen. It's size is defined as $x_{screen}$ by $y_{screen}$. For a perspective projection, the surface is flat in world space (see FIG. 4 and it corresponding screen display in FIG. 5). To produce a non-perspective projection, such as a cylindrical projection for example, we bend the surface to become a cylinder (see FIG. 6 and its corresponding screen display in FIG. 7).

Figure 8:
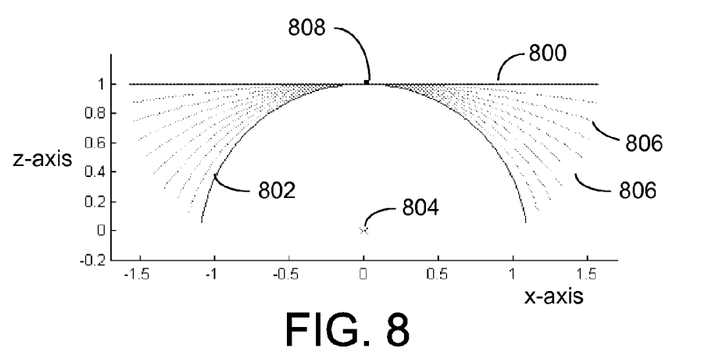
FIG. 8 is a graph illustrating how a surface can be warped from a flat/perspective to a cylindrical/perspective, with some intermediate projections mixing the perspective and cylindrical perspectives also shown.
Figure 9:
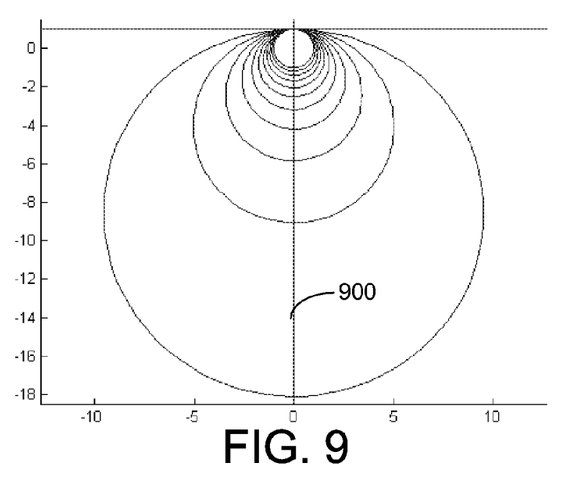
FIG. 9 is a graph depicting an alternative way of viewing the surfaces of FIG. 8 as cylinders of increasing radii with the viewpoint kept at a unit distance away from the cylinder wall.
Figure 10:
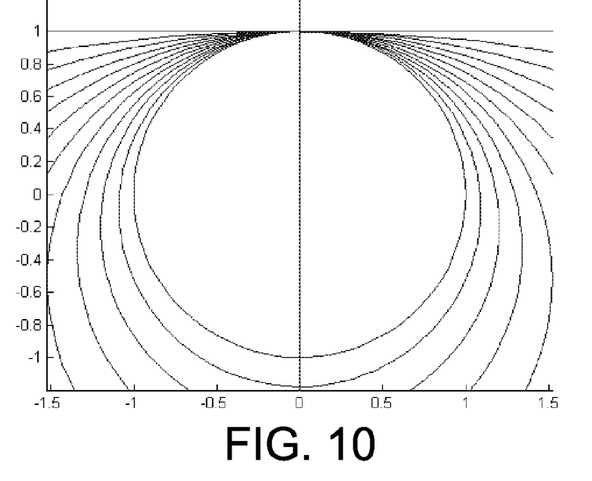
FIG. 10 is a graph depicting a close-up portion of the graph of FIG. 9, with additional partial cylinders shown.

In general, the projective surface is smoothly warped from a flat surface when the field of view is small (e.g., below about 60 degrees) to one that is fully curved (into a cylinder or sphere) when the field of view exceeds some threshold (e.g., about 120 degrees). The surface is also scaled to maintain a smoothly varying size at the center of the screen during the warp. Given this idea of bending the surface, it is easy to come up with a projection that is in-between a perspective and a non-perspective projection by just bending the surface part of the way. For example, in the case of a cylindrical projection, the surface is bent, as shown in FIG. 8, from a flat/perspective 800 to a cylindrical surface 802. The light rays meet in the center of projection represented by the small cross 804. Some intermediate projections 806, mixing perspective and cylindrical, are also shown. Alternatively this can be viewed as increasing the radius of the cylinder while always keeping the viewpoint a unit distance away from the cylinder wall, as shown in FIGS. 9 and 10. These figures show how enlarging and moving the circles has the effect of unbending the surface. The surfaces 806 in FIG. 8 are created by cutting out arcs of constant length from the circles in FIGS. 9 and 10.

Continuing with the example of a cylindrical projection as the non-perspective projection, without loss of generality, consider a cylinder with unit radius and the viewpoint in the center. Unwrapping of the cylinder to a plane is done by increasing it's radius and moving the cylinder's center back along the z axis, so that the cylindrical surface always passes through the point $(x_a=0, z_a=1)$, i.e., point 808 shown in FIG. 8. It is noted that this point 808 gets projected to the center of the screen.

Given the foregoing, it will now be described how the circles are computed for given bending-factors. It is known that the point $(x_a, z_a)$ lies on the circle. Furthermore, it is known that the center lies on the line x=0 (i.e., the vertical line 900 shown in FIG. 9). Now, a second anchor point $(x_b, z_b)$ is needed on the circle to define it non-ambiguously, and to parameterize the bending.

Let $(x_b, z_b)$ lie on a unit circle around $(x_a, z_a)$, then it can be written as:

$$x_b = x_a + \cos(\alpha) \qquad (1)$$

$$z_b = z_a - \sin(\alpha), \qquad (2)$$

where α is the parameter that controls how much the surface is bent. This parameter runs from 0 for a perspective projection to arc sin(0.5)=30 degrees for a cylindrical projection.

Having the two points on the circle, and the restriction that the center lies on the x=0 line, the radius and center of the circle can be computed as:

$$r_c = 1/(2*\sin(\alpha)) \qquad (3)$$

$$x_c = 0 \qquad (4)$$

$$z_c = (2*\sin(\alpha)-1)/(2*\sin(\alpha)) = 1 - r_c \qquad (5)$$

The goal is to map the screen to a constant-length arc of these circles centered around $(x_a, z_a)$. To do so $x_{screen}$ is mapped to the point $(x_{int}, z_{int})$ on the circle that has distance $x_{screen}$ from $(x_a, z_a)$. Thus:

$$x_{int} = x_c + \sin(x_{screen}/r_c)*r_c = \sin(x_{screen}/r_c)*r_c \qquad (6)$$

$$z_{int} = z_c + \cos(x_{screen}/r_c)*r_c = \cos(x_{screen}/r_c)*r_c + (1-r_c). \qquad (7)$$

And thus, θ can be computed for $(x_{int}, z_{int})$ as:

$$\theta = a\tan 2(x_{int}, z_{int}), \qquad (8)$$

where a tan 2 refers to the common library function that computes the arctangent of the two variables (e.g., x and z). It is similar to calculating the arctangent of z/x, except that the signs of both arguments are used to determine the quadrant of the result.

The previous paragraphs explained how the projective surface is bent horizontally and the θ angle is computed. Next, it will be explained how the φ angle is computed. The technique is similar, except, now the center point of the circles lies not on the line x=0, but on the normal of the point $(x_{int}, z_{int})$.

A point $(x_s, z_s)$ is computed that has unit distance in the normal direction from $(x_{int}, z_{int})$ and a normal vector $(x_n, z_n)$ as follows:

$$x_s = x_{int} - \sin(x_{screen}/r_c) \qquad (9)$$

$$z_s = z_{int} - \cos(x_{screen}/r_c) \qquad (10)$$

$$x_n = x_{int} - x_s \qquad (11)$$

$$z_n = z_{int} - z_s \qquad (12)$$

If β is the vertical bending coefficient, the radius of the circle can be computed as:

$$r = 1/(2*\sin(\beta)) \qquad (13)$$

Thus, the final points on the circles can be computed as:

$$x = x_s + x_n*(\cos(y_{screen}/r) + (1-r)) \qquad (14)$$

$$y = \sin(y_{screen}/r)*r \qquad (15)$$

$$z = z_s + z_n*(\cos(y_{screen}/r) + (1-r)) \qquad (16)$$

Global transformations are then applied to the point x, y and z (e.g., rotation). Let $\theta_0$ and $\phi_0$ be the global rotation angles. First rotate around the x-axis by $\phi_0$:

$$(x,y,z) = (x, \sin(\phi_0)*z + \cos(\phi_0)*y, \cos(\phi_0)*z - \sin(\phi_0)*y) \qquad (17)$$

And then around the y-axis by $\theta_0$:

$$(x,y,z) = (\cos(\theta_0)*x - \sin(\theta_0)*z, y, \sin(\theta_0)*x + \cos(\theta_0)*z) \qquad (18)$$

The θ and φ angles can then be computed as:

$$\theta = a\tan 2(x,z) \qquad (19)$$

$$\phi = a\tan 2(y, \sqrt{x^2+z^2}) \qquad (20)$$

Zooming is done simply by scaling $x_{screen}$ and $y_{screen}$.

2.1.2 Bending Parameters

The foregoing bending parameters (i.e., α and β) used to compute the θ and φ angles, are set automatically based on the zoom level (i.e. the scaling of the projective surface). The parameters α and β are simply a sigmoid function of the zoom level by the following formulas:

$$\alpha = \alpha_{max}/(1+\exp((zoom-mid)*scale)) \qquad (21)$$

where $\alpha_{max}$ is arc sin(0.5)=30 degrees and zoom is the current zoom level, and $$\beta = \beta_{max}/(1+\exp((zoom-mid)*scale)), \qquad (22)$$

where $\beta_{max} = \alpha_{max}$.

The parameters mid and scale in Eqs. (21) and (22) control where the sigmoid hits $\alpha_{max}/2$, and the steepness. As an example, in tested embodiments, the default values for these parameters were set to mid=deg2rad(100) and scale=6 with success. However, other values for these parameters could also be employed. Generally, by way of example but not limitation, the mid parameter can range between 50 and 130 degrees, while the scale parameter can range between 2 and 10.

3.0 Other Embodiments

In the foregoing description of the embodiments of the present dynamic wide angle image viewing technique, θ and φ were computed given an x and y screen coordinate pair. Thus, for a given pixel or vertex point, a θ and φ were computed. Another way of approaching the problem is to first establish a mesh of vertices defining a triangulation on the input parameterization, θ and φ. These vertices are then mapped to a virtual geometric object, for example a unit sphere if the input parameterization is spherical. This object is rotated to the current viewing direction. Each vertex is then be projected to one or more viewing parameterizations, for example, perspective planes, cylinders, or spheres using well known methods. For projections in-between, for example, between perspective and cylindrical, the corresponding projected points are interpolated in screen space. This establishes the texture coordinates corresponding to each vertex of the mesh on the screen. The resulting triangles from the mesh are then rendered using standard graphics processing.

Figure 11A:
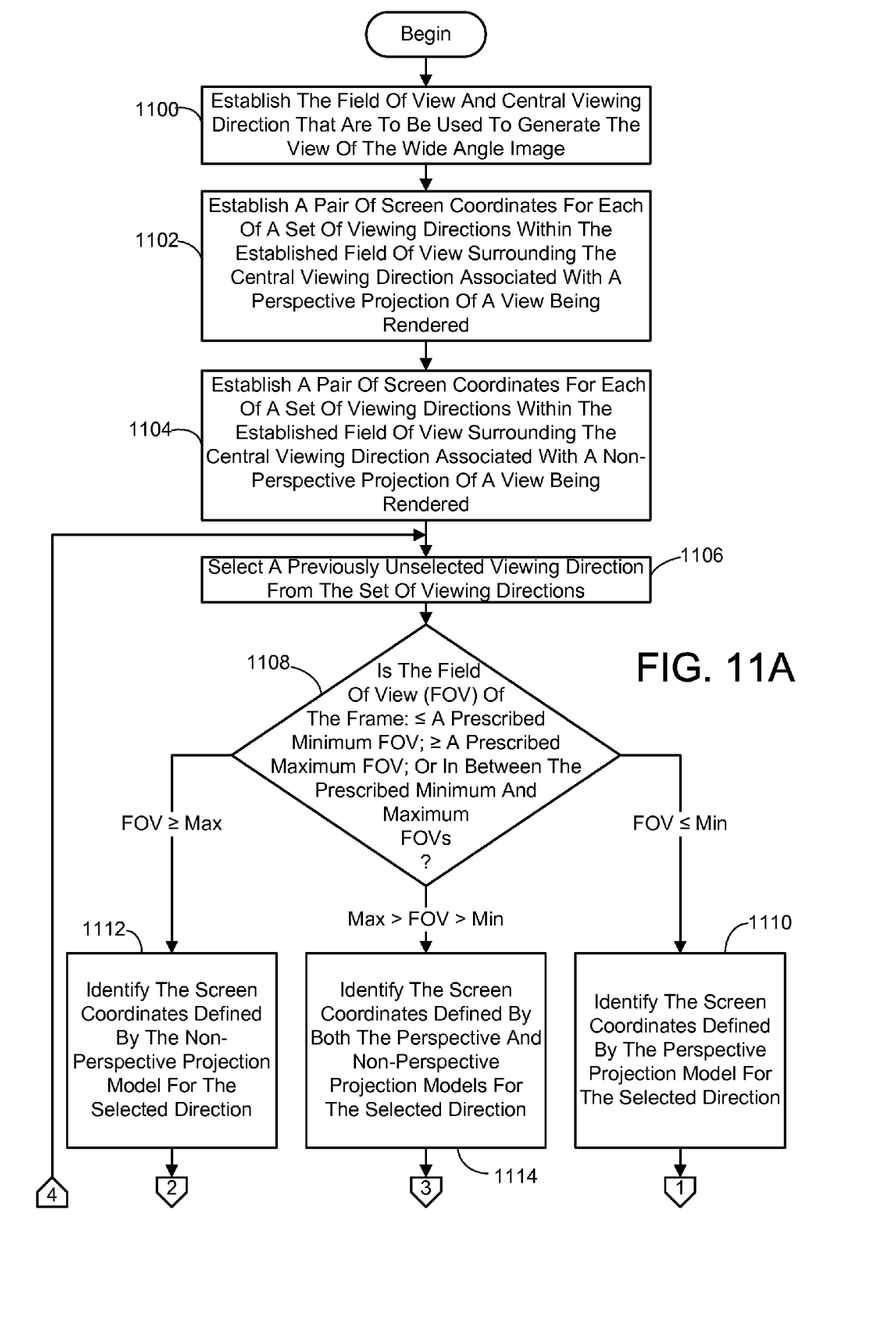
FIGS. 11A-B are a continuing flow diagram generally outlining one embodiment of a process for dynamically viewing a wide angle image which transitions between the perspective projection and a non-perspective projection using a blending approach.
Figure 11B:
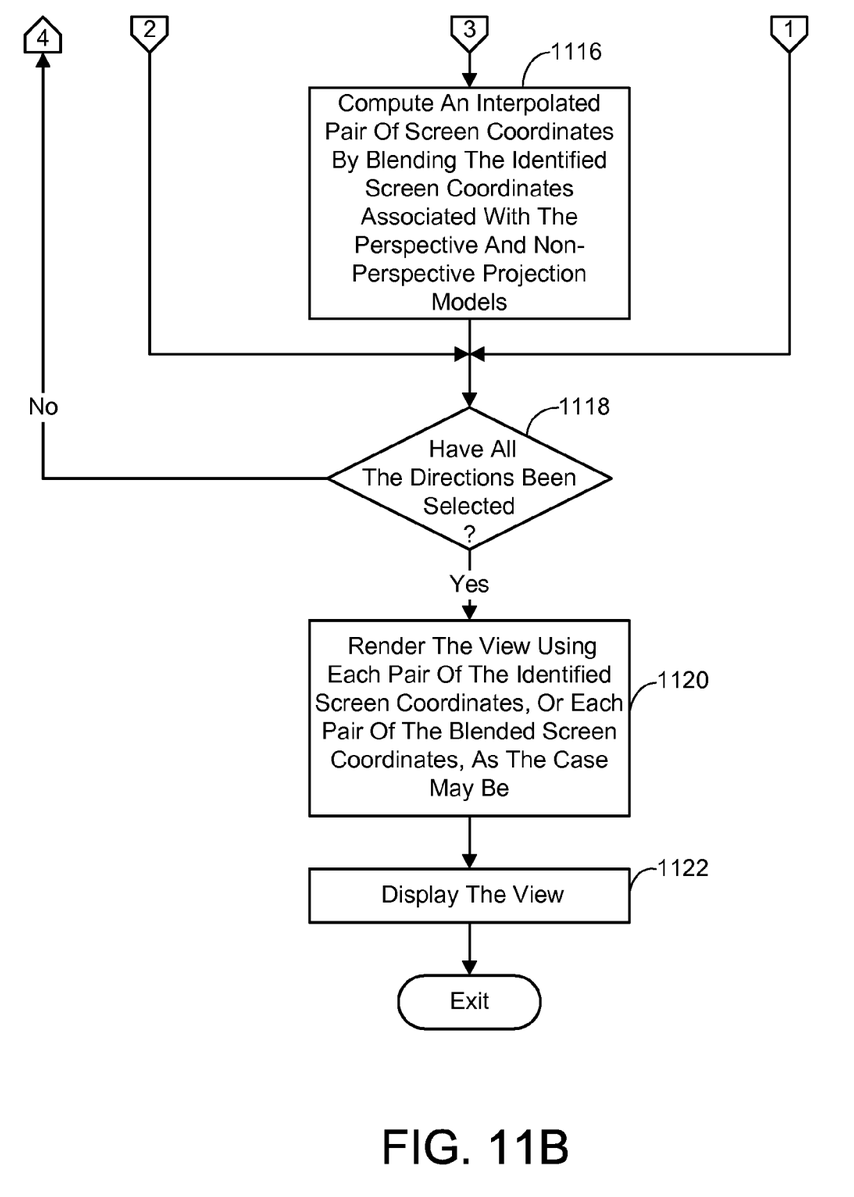

More particularly, referring to FIGS. 11A-B, the alternate technique involves first establishing the field of view and a central viewing direction that are to be used to generate the view of the wide angle image (1100). The central viewing direction is the direction from the viewpoint toward the center of the current region of the wide angle image that is to be rendered and displayed. A pair of screen coordinates is then established for each of a set of viewing directions of interest within the established field of view and surrounding the established central viewing direction, which is associated with a perspective projection of a view being rendered (1102). Similarly, a pair of screen coordinates is established for each of a set of viewing directions of interest within the established field of view and surrounding the established central viewing direction, which is associated with a non-perspective projection of the view being rendered (1104). The viewing directions of interest could be associated with, for example each pixel or vertex location of the view that is to be rendered and displayed.

Once the foregoing has been established, a previously unselected viewing direction is selected from the set of viewing directions of interest (1106). It is then determined if the field of view of the frame being rendered based on the zoom level is less than or equal to a prescribed minimum field of view value (e.g., about 60 degrees), more than or equal to a prescribed maximum field of view value (e.g., about 120 degrees), or in between the prescribed values (1108). If the field of view is found to be less than the prescribed minimum field of view value, the screen coordinate values x and y defined by the perspective projection model for the selected θ and φ values are identified (1110). If, on the other hand, it is determined that the field of view of the frame being rendered based on the zoom level is more than the prescribed maximum field of view value, the x and y values defined by the non-perspective projection model for the selected θ and φ values are identified. However, if it is found that the field of view is between the prescribed maximum and minimum field of view values, a blending approach is taken. More particularly, the x and y values defined by both the perspective and non-perspective models for the selected θ and φ values are identified (1114). An interpolated pair of screen coordinates is then computed based on a blending of the identified screen coordinates associated with the perspective and non-perspective projection models (1116). In one embodiment, this is accomplished using a blending factor, alpha. Alpha is computed as the difference between the maximum field of view value and the field of view associated with the current frame being rendered, divided by the difference between the maximum field of view value and the minimum field of view value. The interpolated x and y values for each pixel or vertex are then computed as a linear blend of the x and y values defined by the pre-computed perspective projection model, and the x and y values pre-computed by the non-perspective projection model for the selected θ and φ values and the field of view.

The technique continues by determining if all the directions in the set of directions of interest have been selected and processed (1118). If not, actions (1106) through (1118) are repeated until all the directions have been considered. At that point, the view that is to be displayed is rendered using each pair of the identified screen coordinates, or each pair of the blended screen coordinates, as the case may be (1120). The rendering is accomplished in the same way described in connection with the embodiment of the technique of FIG. 3. More particularly, a conversion is made, if necessary, between the x and y values and the texture coordinates of the projection associated with the image data. As indicated previously, these conversions are well known and so will not be described in any detail in the present description. Once all the texture coordinates are known, the textures corresponding to these coordinates are obtained from the stored image data and used to render the view. The view is then displayed on the display screen (1122).

Figure 12:
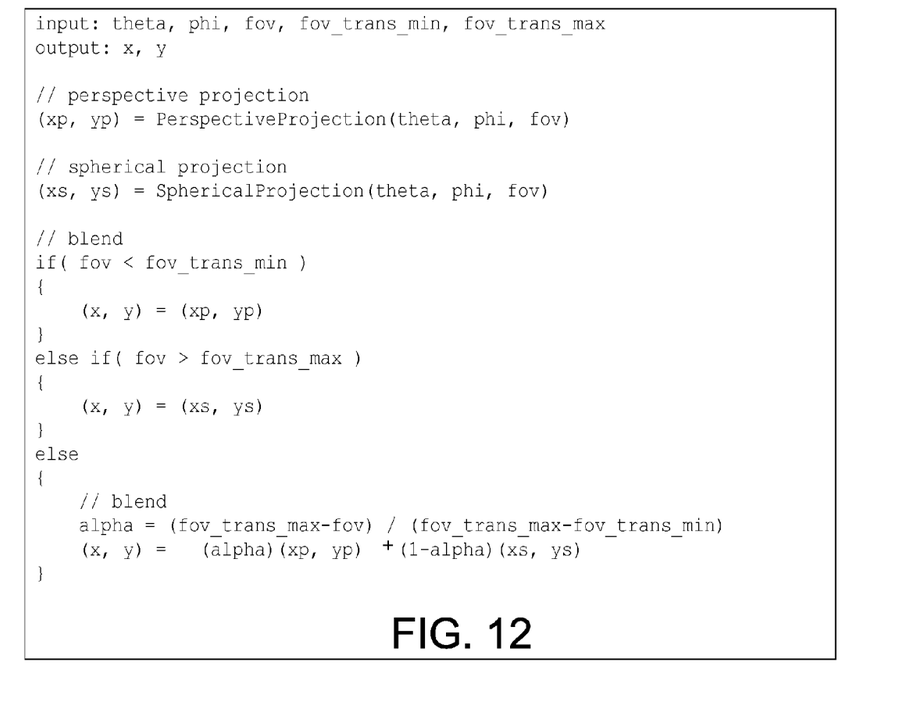
FIG. 12 is a pseudo code listing for computing interpolated x and y values in accordance with one embodiment of a process for dynamically viewing a wide angle image which transitions between the perspective projection and a non-perspective projection using a blending approach.

One embodiment of the foregoing process for computing the interpolated x and y values defined in pseudo-code is shown in FIG. 12.

It should also be noted that any or all of the aforementioned embodiments throughout the description may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for dynamically viewing a wide angle image while zooming between a wide angle view and a narrower angle view, the process comprising using a computer to perform the following process actions for each view of the wide angle image to be presented to a user:
   establishing a field of view desired for the view to be presented; and
   rendering and displaying the view based on the established field of view, such that the projection transitions between a perspective projection representing a projection onto a planar surface associated with narrower angle views and a non-perspective projection representing a projection onto a non-planar surface associated with wider-angle views.

2. The process of claim 1, wherein the process action of rendering and displaying the view based on the established field of view, comprises the actions of:
   rendering the view using the perspective projection whenever the established field of view is below a prescribed zoom level; and
   rendering the view using the non-perspective projection whenever the established field of view is above the prescribed zoom level.

3. The process of claim 1, wherein the process action of rendering and displaying the view based on the established field of view, comprises an action of rendering the view using a projection that is between the perspective and non-perspective projections by warping the perspective projection toward the non-perspective projection by an amount that is proportional to the established field of view, with the amount of warping being greater for wider fields of view.

4. The process of claim 1, wherein the non-perspective projection is a cylindrical projection.

5. The process of claim 1, wherein the non-perspective projection is a spherical projection.

6. A computer-implemented process for dynamically viewing a wide angle image on a display screen while zooming between a wide angle view and a narrower angle view, the process comprising using a computer to perform the following process actions:

establishing a pair of screen coordinates for each pixel or vertex location of the display screen;

establishing a field of view and viewing direction which are used to generate a view of the wide angle image that is to be displayed on the display screen;

for each pair of screen coordinates, computing a ray defined by two angles representing the direction from a viewer through the pair of screen coordinates under consideration, wherein said view comprises a projection that is between a perspective projection and a non-perspective projection which is generated by warping the perspective projection toward the non-perspective projection by an amount that is proportional to the established field of view, with the amount of warping being greater for wider fields of view;

rendering the view of the wide angle image based on the computed rays; and displaying the rendered view on the display screen.

7. The process of claim 6, wherein the process action of rendering the view of the wide angle image, comprises the actions of:

identifying texture coordinates in a stored mapping of the wide angle image that correspond to the computed ray;

obtaining the texture data corresponding to the identified texture coordinates from the mapping; and rendering the portion of the view using the obtained texture data.

8. The process of claim 7, wherein the stored mapping of the wide angle image employs a projection that is not spherical, and wherein prior to performing the process action of identifying texture coordinates in the stored mapping that correspond to the computed ray, performing an action of converting the direction represented by the computed ray to the projection model employed by the stored mapping.

9. The process of claim 6, wherein the wide angle image is a virtual image, and wherein the process action of rendering the view of the wide angle image, comprises the actions of:

generating the texture data corresponding to the identified texture coordinates; and rendering the portion of the view using the generated texture data.

10. The process of claim 6, wherein the process action of computing the ray, comprises the actions of:

computing $r_c = 1/(2*\sin(\alpha))$, wherein $\alpha$ is a first bending parameter;

computing $x_{int} = \sin(x_{screen}/r_c)*r_c$, wherein $x_{screen}$ is one of the screen coordinates;

computing $z_{int} = \cos(x_{screen}/r_c)*r_c + (1-r_c)$;

computing $x_s = x_{int} - \sin(x_{screen}/r_c)$;

computing $z_s = z_{int} - \cos(x_{screen}/r_c)$;

computing $x_n = x_{int} - x_s$;

computing $z_n = z_{int} - z_s$;

computing $r = 1/(2*\sin(\beta))$, wherein $\beta$ is a second bending parameter;

computing $y = \sin(y_{screen}/r)*r$ wherein $y_{screen}$ is the other of the screen coordinates;

computing $x = x_s + x_n * (\cos(y_{screen}/r) + (1-r))$;

computing $z = z_s + z_n * (\cos(y_{screen}/r) + (1-r))$;

computing the first angle $\theta$ of the ray as $\theta = \operatorname{atan2}(x, z)$; and computing the second angle $\phi$ of the ray as $\phi = \operatorname{atan2}(y, \sqrt{x^2+z^2})$.

11. The process of claim 10, wherein the process action of computing the first angle $\theta$ of the ray, comprises an action of computing the first bending parameter $\alpha$ as $\alpha = \alpha_{max}/(1+\exp((\text{zoom}-\text{mid})*\text{scale}))$ wherein $\alpha_{max}$ is $\arcsin(0.5) = 30$ degrees, zoom is the zoom level associated with the established field of view, and mid and scale are scaling parameters.

12. The process of claim 11, wherein the process action of computing the second angle $\phi$ of the ray, comprises an action of computing the second bending parameter $\beta$ as $\beta = \beta_{max}/(1+\exp((\text{zoom}-\text{mid})*\text{scale}))$, wherein $\beta_{max} = \alpha_{max}$.

13. The process of claim 12, wherein the scaling parameter mid ranges between about 50 and about 130 degrees, and the scaling parameter scale ranges between about 2 and about 10.

14. The process of claim 12, wherein the scaling parameter mid is set to deg2rad(100) and the scaling parameter scale is set to 6.

15. A computer-implemented process for dynamically viewing a wide angle image on a display screen while zooming between a wide angle view and a narrower angle view, the process comprising using a computer to perform the following process actions:

establishing a field of view and a central viewing direction desired for a view of the wide angle image to be displayed on the display screen;

establishing for each of a set of viewing directions of interest within the established field of view surrounding the established central viewing direction, a pair of screen coordinates for a perspective projection of a view being rendered;

establishing for each of the set of viewing directions of interest within the established field of view surrounding the established central viewing direction, a pair of screen coordinates for a non-perspective projection of a view being rendered;

for each of the set of viewing directions of interest, identifying the pair of screen coordinates associated with the direction under consideration for the perspective projection of the view whenever the field of view is equal to or below a prescribed minimum field of view, identifying the pair of screen coordinates associated with the direction under consideration for the non-perspective projection of the view whenever the field of view is equal to or above a prescribed maximum field of view, and identifying the pair of screen coordinates associated with the direction under consideration for both the perspective and non-perspective projections of the view whenever the field of view is between the prescribed minimum and maximum fields of view, and computing an interpolated pair of screen coordinates based on a blending of the identified screen coordinates associated with the perspective and non-perspective projections;

rendering the view using each pair of the identified screen coordinates, or each pair of the blended screen coordinates whenever they have been computed; and displaying the view on the display screen.

16. The process of claim 15, wherein the process action of rendering the view, comprises the actions of:

identifying a pair of texture coordinates in a stored mapping of the wide angle image that correspond to each pair of the identified screen coordinates, or to each pair of the blended screen coordinates whenever they have been computed;

obtaining the texture data corresponding to each pair of the identified texture coordinates from the mapping; and rendering the view using the obtained texture data.

17. The process of claim 16, wherein the stored mapping of the wide angle image employs a projection that is not the same as the projection used to obtain the screen coordinate pairs, and wherein prior to performing the process action of identifying the pair of texture coordinates in the stored mapping of the wide angle image that correspond to each pair of the identified screen coordinates, or to each pair of the blended screen coordinates whenever they have been computed, performing an action of converting the screen coordinate pairs to the projection employed by the stored mapping.

18. The process of claim 15, wherein the wide angle image is a virtual image, and wherein the process action of rendering the view, comprises the actions of:
generating the texture data corresponding to each pair of the identified screen coordinates, or to each pair of the blended screen coordinates whenever they have been computed; and
rendering the view using the generated texture data.

19. The process of claim 15, wherein the process action of computing the interpolated pair of screen coordinates based on the blending of identified screen coordinates associated with the perspective and non-perspective projections, comprises the actions of:
computing a blending factor as the difference between the prescribed maximum field of view and the established field of view, divided by the difference between the prescribed maximum field of view and the prescribed minimum field of view; and
computing the interpolated pair of screen coordinates as the sum of the identified screen coordinates associated with the perspective projection multiplied by the blending factor and the identified screen coordinates associated with the non-perspective projection multiplied by one minus the blending factor.

20. A computer-implemented process for dynamically viewing a wide angle image while zooming between a wide angle view and a narrower angle view, the process comprising using a computer to perform the following process actions for each view of the wide angle image to be presented to a user:
establishing a field of view desired for the view to be presented; and
rendering and displaying the view based on the established field of view, such that the projection transitions between a perspective projection associated with narrower angle views and a non-perspective projection associated with wider-angle views, said rendering comprising,
rendering the view using the perspective projection whenever the established field of view is equal to or below a first prescribed zoom level,
rendering the view using the non-perspective projection whenever the established field of view is equal to or above a second, higher prescribed zoom level, and
rendering the view using a blend of the perspective and non-perspective projections whenever the established field of view falls between the first and second prescribed zoom levels.

* * * * *